May 5, 1942.  A. S. T. LAGAARD  2,281,939

TOOL

Original Filed Oct. 27, 1937

Inventor

Alexander S. T. Lagaard

Patented May 5, 1942

2,281,939

UNITED STATES PATENT OFFICE 2,281,939

TOOL

Alexander S. T. Lagaard, Minneapolis, Minn.

Original application October 27, 1937, Serial No. 171,209. Divided and this application January 15, 1940, Serial No. 313,969

3 Claims. (Cl. 30—294)

My invention relates to a tool for making joints in wallboard and has for an object to provide tools whereby the joints may be easily and quickly formed.

Another object resides in providing a tool provided with a holder having a surface with a platelike guide projecting outwardly therefrom and with blades disposed on each side of said guide and parallel with said guide.

Other objects of the invention reside in the novel combination of parts and in the details of construction hereinafter illustrated and/or described.

This application is a division of my co-pending application for patent for Method of and devices for installing wallboard, Serial No. 171,209, filed October 27, 1937.

Figure 1:
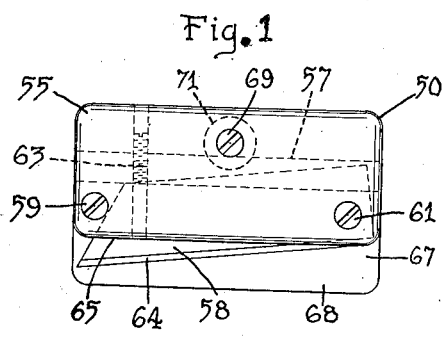
Figure 1 is a side elevational view of a tool illustrating an embodiment of my invention.
Figure 2:
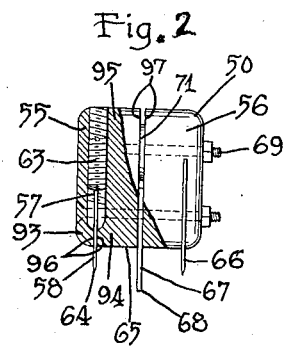
Figure 2 is an end elevational view of the structure shown in Figure 1.

In the installation of wallboard by the method disclosed in my co-pending application for patent the wallboard is joined at its edges in the following manner: Where the sheets of wallboard lie in the same plane the sheets are first formed with slits along the facing edges thereof and parallel with the exposed surfaces of the wallboard. These slits are formed by means of a slitting tool, such as is shown in my co-pending application for patent above referred to. The sections are then erected with the slit edges spaced from one another a slight amount to provide a slot therebetween which extends throughout the length of the joint. The joint grooving tool shown in Figures 1 and 2 is next applied with its guide in the slot between the sheets of wallboard and the corners of the sheets outwardly of the slits therein removed to form a groove partly in one sheet of wallboard and partly in the other sheet. After these corner pieces have been removed fasteners are driven through the remaining undercut portions of the wallboard and into the supports and a preformed filler strip inserted into the groove to conceal the fasteners and to form a closed joint.

My joint grooving tool is designated by the reference numeral 50 and is shown in detail in Figures 1 and 2. This tool comprises a holder constructed from two blocks 55 and 56 which are identical in construction excepting that one is left handed and the other is right handed. For this reason only the block 55 will be described in detail. Block 55 is constructed with a slit 57 which extends through an edge 65 of the block and which forms in the said block two juxtaposed parts 93 and 94 and a connecting portion 95. This slit provides facing surfaces 96 on the two parts 93 and 94 between which a blade 58 is disposed. Blade 58 is constructed with a cutting edge 64. Blade 58 is held in position by means of two bolts 59 and 61 which extend jointly through the blocks 55 and 56. The bolt 61 also extends through the blade 58 at one end and forms a pivot on which the blade may swing. These bolts serve to hold the parts clamped together. A set screw 63 threaded into the block 56 and disposed in the plane of the slit 57 adjusts the position of the cutting edge 64 of the blade 58 with respect to the edge 65 of said block. Block 56 is similarly provided with a blade 66 which is parallel with blade 57.

The two blocks 55 and 56 have facing surfaces 97. Between these surfaces is disposed a guide plate 67. The two bolts 59 and 61 extend through this guide plate and hold the guide plate firmly clamped between the said blocks. The guide plate 67 has the lowermost portion 68 thereof extending below the edges 65 of the blocks 55 and 56 a distance less than the thickness of the board with which the tool is to be used. To hold the two blocks 55 and 56 properly spaced at their uppermost portions another bolt 69 is employed which extends jointly through both the blocks 55 and 56. A washer 71 encircles the said bolt and holds the portions of the blocks 55 and 56 through which the bolt extends properly spaced. This washer is the same thickness as the guide plate 67. The distance between the two blades 58 and 66 may be increased by inserting shim washers on the bolts 59, 61 and 69 and on either side of the washer 71 and plate 67.

The manner of using my invention is as follows:

The method of forming a joint between two coplanar sheets of wallboard with my invention will now be described. Prior to erection of the wallboard the sheets of wallboard are disposed one at a time upon a table or other flat surface and slit along the edges of the same parallel with the outer surfaces of the sheets. The two sheets of wallboard are then attached to the studs to which they are to be applied and preferably to studs other than the stud along which the joint is to be formed. The two sheets are applied so that a narrow slot is formed between the same of a width slightly greater than the thickness of the guide plate 67 of the joint forming tool 50 and so that the exposed edges of the slits formed in the adjacent pieces of wallboard face one another. The joint grooving tool 50 is now grasped in the hand and the guide plate 67 inserted into the slot between the two adjacent sheets of wallboard. This tool is then run along the outermost surfaces of the wallboard and the cutting edges 64 of the blades 58 and 56 caused to cut through the severed portions of the wallboard formed by the slits previously made therein. The removal of these portions of the wallboard may be accomplished in a single cut or the cuts may be progressively deepened by successively running the tool along the board until the corner portions of the board are freed. After removal of these portions of wallboard a groove is formed partly in one sheet of wallboard and partly in the adjacent sheet, which is of uniform width throughout its extent. Fasteners may then be driven into the remaining portions of the wallboard within the groove and a filler strip secured within the groove to cover up the slot formed between the two sheets of wallboard and cover the fasteners used in the joint.

The advantages of my invention are manifest. The tool used in forming joints in wallboard is extremely simple and practical in construction. The tool may be adjusted to cut any width or depth of groove within the limits of its capacity to accommodate different thicknesses of wallboard. The blades are easily and quickly adjusted for depth. The tool is easy to hold and manipulate. With my invention closed joints may be effectively produced. The tool can be constructed at a nominal expense.

Having described my invention what I consider as new and desire to protect by Letters Patent is:

1. A tool for making a groove of uniform width in adjoining sections of wallboard, said tool comprising a holder having a body portion provided with spaced parallel surfaces disposed a distance apart substantially equal to the width of the groove, and with a guage surface therebetween, a cutting blade overlying each of said parallel surfaces and arranged with its cutting edge projecting outwardly from said guage surface, the outermost portion of said cutting edge extending a distance beyond the guage surface equal to the depth of the groove, plates overlying said blades, means extending through said plates and engaging said body for clamping said blades in position upon said parallel surfaces and a planiform guide member carried by said body and issuing from the guage surface thereof, said guide member being parallel with said parallel surfaces and equally spaced therefrom.

2. A tool for making a groove of uniform width in adjoining sections of wallboard, said tool comprising a holder having a body portion constructed of two parts, each part having two spaced parallel surfaces and a guage surface therebetween, said parts being arranged with two of their parallel surfaces adjacent one another, a planiform guide member disposed between said adjacent surfaces, means extending through said guide member and secured to said parts for holding said guide member attached to said holder, blades overlying said outermost parallel surfaces of said parts and having cutting edges extending beyond said guage surfaces and clamping means for holding said blades attached to the holder.

3. A tool for making a groove of uniform width in adjoining sections of wallboard, said tool comprising a holder having an elongated body portion provided with spaced parallel surfaces disposed a distance apart equal to the width of the groove, and with a guage surface therebetween, a cutting blade overlying each of said parallel surfaces and arranged with its cutting edge projecting outwardly from said guage surface, the outermost portion of said cutting edge extending a distance beyond the guage surface equal to the depth of the groove, plates overlying said blades, means extending through said plates and engaging said body for clamping said blades in position upon said parallel surfaces and planiform guide means at each end of said body portion issuing from the guage surface thereof, said guide means at both ends of the body portion being parallel with said blades and equally spaced therefrom.

ALEXANDER S. T. LAGAARD.